United States Patent
Boys et al.

(10) Patent No.: US 10,079,510 B2
(45) Date of Patent: Sep. 18, 2018

(54) INDUCTIVE POWER TRANSFER PICK-UP CIRCUIT WITH OUTPUT CURRENT DOUBLER

(71) Applicant: Auckland UniServices Limited, Auckland (NZ)

(72) Inventors: John Talbot Boys, Takapuna (NZ); Nicholas Athol Keeling, Glenfield (NZ)

(73) Assignee: Auckland UniServices Limited, Auckland (NZ)

( * ) Notice: Subject to any disclaimer, the term of this patent is extended or adjusted under 35 U.S.C. 154(b) by 33 days.

(21) Appl. No.: 15/106,642

(22) PCT Filed: Dec. 19, 2014

(86) PCT No.: PCT/NZ2014/050025
§ 371 (c)(1),
(2) Date: Jun. 20, 2016

(87) PCT Pub. No.: WO2015/093990
PCT Pub. Date: Jun. 25, 2015

(65) Prior Publication Data
US 2017/0033607 A1    Feb. 2, 2017

(30) Foreign Application Priority Data

Dec. 20, 2013 (NZ) ........................ 619303
Aug. 19, 2014 (NZ) ........................ 628991

(51) Int. Cl.
*H01F 38/14* (2006.01)
*H02J 50/12* (2016.01)
(Continued)

(52) U.S. Cl.
CPC .............. *H02J 50/12* (2016.02); *H01F 38/14* (2013.01); *H02J 5/005* (2013.01); *H02J 7/025* (2013.01); *H02J 50/40* (2016.02); *H02M 7/06* (2013.01)

(58) Field of Classification Search
CPC ............ H01F 38/14; H02J 5/005; H02M 7/06
See application file for complete search history.

(56) References Cited

U.S. PATENT DOCUMENTS 5,172,308 A    12/1992  Tohya
5,936,857 A     8/1999  Jacobs et al.
(Continued)

FOREIGN PATENT DOCUMENTS

WO    WO-2007/126321 A1    11/2007
WO    WO-2015/093990       6/2015

OTHER PUBLICATIONS

"International Application No. PCT/NZ2014/050025, International Search Report and Written Opinion dated May 19, 2015", (May 19, 2015), 13 pgs.

(Continued)

*Primary Examiner* — Robert Deberadinis
(74) *Attorney, Agent, or Firm* — Schwegman Lundberg & Woessner, P.A.

(57) ABSTRACT

An inductive power transfer (IPT) pick-up circuit has a full-wave rectifier ($D_1$-$D_4$) coupled to a resonant circuit ($L_1$ $C_1$) and adapted to rectify an AC current received from the resonant circuit. A pair of inductors ($L_2$ $L_3$) are provided, being arranged to couple the rectifier to an output ($V_{Load}$) of the pick-up circuit and alternately store and release energy to the output.

21 Claims, 4 Drawing Sheets

(51) Int. Cl.
*H02J 50/40* (2016.01)
*H02M 7/06* (2006.01)
*H02J 7/02* (2016.01)
*H02J 5/00* (2016.01)

(56) References Cited

U.S. PATENT DOCUMENTS

2002/0034085 A1 3/2002 Huang et al.
2012/0170337 A1 7/2012 Lisi et al.
2013/0099588 A1 4/2013 Yeo et al.

OTHER PUBLICATIONS

"European Application No. 14871146.8, Extended European Search Report dated Jul. 10, 2017", (Jul. 10, 2017), 8 pgs.

INDUCTIVE POWER TRANSFER PICK-UP CIRCUIT WITH OUTPUT CURRENT DOUBLER

PRIORITY CLAIM TO RELATED APPLICATIONS

This application is a U.S. national stage application filed under 35 U.S.C. § 371 from International Application Ser No. PCT/NZ2014/050025, which was filed 19 Dec 2014, and published as WO2015/093990 on 25 Jun. 2015, and which claims priority to New Zealand Application No. 619303, filed 20 Dec. 2013, and to New Zealand Application No. 628991, filed 19 Aug. 2014, which applications and publication are incorporated by reference as if reproduced herein and made a part hereof in their entirety, and the benefit of priority of each of which is claimed herein.

FIELD OF THE INVENTION

This invention relates to a wireless power transfer pick-up circuit. More particularly, the invention relates to a circuit for selectively increasing the output current of an inductive power transfer (IPT) pick-up circuit.

BACKGROUND

In inductive power transfer (IPT) systems, power is transferred wirelessly by mutual induction between a primary conductor (variously known as a conductive path, pad, or track depending upon its form and/or application) supplied by an alternating-current (AC) power supply (the power supply and track together forming a primary side of the IPT system), and one or more pick-up circuits (forming the secondary side of the system) inductively coupled with the track and electrically coupled to a load to supply power thereto.

While an IPT system bears some superficial similarities with a transformer, there are in fact several key differences. In particular, a transformer is used to step an AC voltage up or down and/or galvanically isolate two circuits, whereas the purpose of an IPT system is used to transfer power wirelessly or contactlessly. Unlike a tightly-coupled conventional iron-core transformer with a coupling coefficient of (or near) unity (i.e. k=1), an IPT system is generally loosely-coupled and therefore has a lower coupling coefficient (e.g. commonly k<0.5) which may also vary dynamically during use if the pick-up circuit is not physically constrained to maintain a fixed alignment with the primary conductor. To optimise efficiency of the contactless or wireless power transfer, the primary power supply and secondary pick-up circuits of an IPT system are both tuned to the same resonant frequency, The resonant frequency is commonly somewhere between 10 and 40 kHz, for example.

The pick-up circuit of the IPT system therefore generally comprises a tuned or resonant circuit comprising at least a pick-up coil and a tuning capacitor. Two typical pick-up topologies are the series-tuned pick-up, in which the tuning capacitor is provided in series with the pick-up coil, or more commonly the parallel-tuned pick-up, in which the tuning capacitor is provided in parallel with the pick-up coil.

When the primary conductor is energised with an AC current at an appropriate frequency, a voltage is induced in the pick-up coil which is inductively coupled therewith. For optimum efficiency, the resonant circuit is thus tuned to resonate at the frequency of the AC current.

In many cases, the pick-up is required to supply a DC current to a load and the pick-up circuit will often be provided with a rectifier to rectify the AC current in the resonant circuit.

An example of a simple parallel-tuned IPT pick-up circuit of the prior art is shown in FIG. 1, The pick-up circuit is inductively coupled with primary track conductor/inductor $L_T$, which induces a voltage in pick-up coil $L_1$. Tuning capacitor $C_1$ is provided in parallel with the pick-up coil, forming a resonant circuit therewith. A bridge rectifier, comprising diodes $D_1$-$D_4$, rectifies the AC current in the resonant circuit, and supplies a DC voltage to the output via DC inductor or choke $L_{DC}$ which acts to smooth the rectified output current. In the illustrated example, the pick-up circuit is coupled to a load, represented by $V_{Load}$. The load may comprise a battery, for example.

One potential disadvantage with the parallel-tuned pick-up circuits of the prior art, such as that shown in FIG. 1, is that they have a constant output current for a given AC track current and inductive coupling. In the parallel-tuned IPT pick-up topologies of the prior art, the output current of the pick-up is fundamentally limited by the short circuit current of the pick-up coil at a given coupling. This limits the output power at a given voltage and makes it difficult and inefficient to power low voltage, high current loads. It is also difficult to design an efficient pick-up which can handle a wide range of output voltages at a constant output power. If more current is required, then the track current must be increased or inductance of the pick-up coil reduced by reducing the number of turns, for example, of the resonant circuit in the pick-up.

OBJECT OF THE INVENTION

It is therefore an object of the invention to provide an IPT pick-up circuit which overcomes or at least ameliorates one or more disadvantages of the prior art, or alternatively to at feast provide the public with a useful choice.

Another object of the invention is to provide an IPT pick-up circuit or a method of operating an IPT pick-up circuit which can provide an increased output current.

Further objects of the invention will become apparent from the following description.

SUMMARY OF INVENTION

Accordingly in one aspect the invention may broadly be said to consist in an inductive power transfer (IPT) pick-up circuit comprising:
  a resonant circuit comprising an inductive pick-up coil and a parallel tuning capacitor;
  a full-wave rectifier coupled to the resonant circuit and adapted to rectify an AC current received therefrom; and
  a pair of inductors, each inductor arranged to couple the rectifier to an output of the pick-up circuit and alternately store and release energy to the output.

Preferably the pair of inductors are arranged whereby a first of the pair of inductors stores energy during a positive period of the AC current and releases energy to the output during a negative period, and a second of the pair of inductors stores energy during the negative period and releases energy to the output during the positive period.

Preferably energy input to the inductors is pulsed, but energy output of the inductors is ordinarily substantially continuous.

Preferably the pair of inductors are each fed by respective halves of the full-wave rectifier, Preferably each of the pair of inductors is provided in series with a diode of the rectifier.

Preferably the full-wave rectifier comprises a diode bridge rectifier, wherein the inductors are each coupled in series between respective common-cathode diodes of the diode bridge rectifier and the output of the pick-up circuit.

Alternatively, the full-wave rectifier may comprise a pair of diodes wherein respective anodes of the pair of diodes are coupled with the output and respective cathodes of each of the pair of diodes are coupled with both the resonant circuit and a respective one of the pair of inductors.

Preferably an output current of the pick-up circuit is equal to the sum of currents through the pair of inductors.

Preferably the pick-up circuit further comprises a mode switch selectively operable to reconfigure the circuit wherein the inductors are coupled in parallel between the rectifier and the output of the pick-up circuit. The term "mode switch" is not limited to a single switch, but may comprise a plurality of switches.

Preferably the mode switch is selectively operated by a controller to control an output current.

Preferably the output current of the pick-up circuit in a first mode is substantially doubled with respect to a second mode.

Preferably each of the pair of inductors comprises a pair of terminals, wherein respective terminals of the pair of inductors are directly coupled together in the second mode.

Preferably in a first mode the pair of inductors are arranged whereby a first of the pair of inductors stores energy during a positive period of the AC current and releases energy to the output during a negative period and a second of the pair of inductors stores energy during the negative period and releases energy to the output during the positive period.

Preferably in a second mode the pair of inductors both act as a choke to smooth the rectified AC current during both positive and negative periods of the AC current.

Preferably the mode switch comprises a bi-directional switch.

Preferably the resonant circuit further comprises an additional capacitor in series with the pick-up coil, wherein the resonant circuit is partially series-tuned.

Preferably the pick-up circuit further comprises a power control switch operable to decouple the output from the rectifier and/or resonant circuit. More particularly, the power control switch is preferably provided in parallel with the output.

Preferably the pick-up circuit further comprises a decoupling switch in parallel with the resonant circuit for selectively decoupling the rectifier from the resonant circuit.

Preferably the decoupling switch comprises an AC switch selectively operated by a controller to decouple the rectifier from the resonant circuit.

Preferably the pick-up circuit comprises a plurality of sub-circuits each coupled with a common output, each sub-circuit comprising a resonant circuit, a full-wave rectifier, and a pair of inductors according to the first aspect of the invention.

Preferably each sub-circuit comprises a mode switch and a decoupling switch, wherein the mode switch and decoupling switch are selectively operated independently with respect to those of at least one other sub-circuit.

Preferably the mode switch and decoupling switch of each sub-circuit are selectively operated independently to control an output current.

Preferably the output current is controlled to maintain a predetermined minimum output current.

Preferably the IPT circuit further comprises a controller configured to control operation of the mode switch and/or decoupling switch. The controller may comprise a microcontroller coupled to an output current sensor and programmed to operates the switches to maintain a predetermined minimum output current, for example.

In a second aspect the invention may broadly be said to consist in an inductive power transfer (IPT) pick-up comprising at least one sub-circuit, the sub-circuit comprising:
  a resonant circuit comprising an inductive pick-up coil and a tuning capacitor;
  a rectifier comprising at least two diodes coupled to the resonant circuit and adapted to rectify an AC current received therefrom;
  a pair of inductors each comprising a first terminal coupled with the rectifier and a second terminal coupled with an output of the pick-up; and
  a mode switch operable to select a mode of operation of the sub-circuit, wherein the first terminal of each of the pair of inductors in a first mode is coupled with a cathode of a respective one of the at least two diodes, and in a second mode is coupled with both cathodes.

Preferably an output current of the sub-circuit is substantially doubled in the first mode with respect to the second mode.

Preferably the mode switch is operable to directly couple the respective first terminals of the pair of inductors. The mode switch preferably comprises an AC or bi-directional switch.

Preferably the sub-circuit further comprises a decoupling switch operable to decouple the resonant circuit from the rectifier.

Preferably the pick-up comprises a plurality of sub-circuits each coupled with a common output.

Preferably the mode switch and/or decoupling switch of each sub-circuit is independently operable.

Preferably the pick-up further comprises a controller associated with the or each mode switch and/or decoupling switch and operable to control said switches based at least in part on an output current of the pick-up.

In a third aspect, the invention may broadly be said to consist in an inductive power transfer (IPT) system comprising:
  a primary side comprising an alternating current (AC) power supply coupled to a primary conductor; and
  a secondary side comprising at least one IPT pick-up circuit according to the first or second aspects of the invention, adapted for wireless power transfer with the primary side.

In a fourth aspect, the invention may broadly be said to consist in a method for controlling an output current of an inductive power transfer (IPT) pick-up circuit, the method comprising steps of:
  sensing an output current of the IPT circuit; and
  selectively operating a mode switch to reconfigure the circuit between a first mode and a second mode dependent at least in part on the sensed output current, wherein the output current of the IPT circuit is substantially doubled in the first mode with respect to the second mode.

Preferably the IPT circuit comprises a resonant circuit, a full-wave rectifier, the mode switch, and a pair of inductors.

Preferably the step of operating the mode switch reconfigures the circuit topology wherein in a first mode each of the pair of inductors are arranged to complementarily and alternately store and release energy during respective positive and negative periods of an AC current in the resonant circuit, and in a second mode both of the pair of inductors are arranged to act as a choke to smooth rectified AC current during both the positive and negative periods.

Preferably the IPT circuit comprises a plurality of sub-circuits coupled or coupleable with a common output, each sub-circuit comprising a resonant circuit, a decoupling switch, a full-wave rectifier, a mode switch, and a pair of inductors.

Preferably the method further comprises a step of selectively and independently operating the plurality of decoupling switches to selectively decouple the respective resonant circuit from the output dependent at least in part upon the sensed output current.

Further aspects of the invention, which should be considered in all its novel aspects, will become apparent from the following description.

DRAWING DESCRIPTION

A number of embodiments of the invention will now be described by way of example with reference to the drawings in which.

DETAILED DESCRIPTION OF THE DRAWINGS

Figure 1:
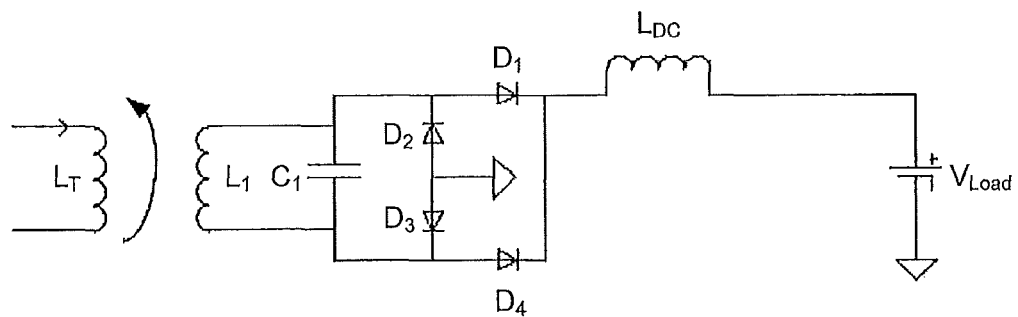
FIG. 1 is a schematic diagram of a parallel-tuned pick-up circuit of the prior art.

Throughout the description like reference numerals will be used to refer to like features in the same and/or different embodiments for convenience. Use of the same reference numeral is not to be taken as a requirement that the respective components of the embodiment or embodiments need necessarily be identical, however.

Figure 2:
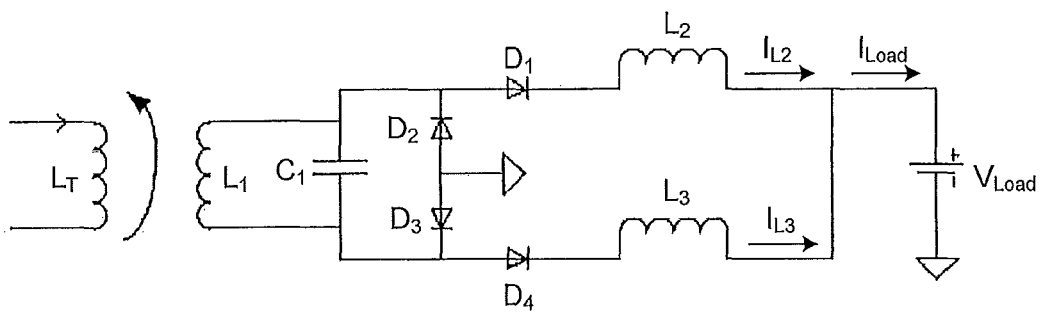
FIG. 2 is a schematic drawing of a parallel-tuned IPT pick-up circuit according to a first embodiment of the present invention.

Referring first to FIG. 2, there is shown a first embodiment of a parallel-tuned IPT pick-up circuit according to the present invention. Like the prior art circuit of FIG. 1, this embodiment of the invention comprises a resonant circuit of the pick-up coil $L_1$ and parallel tuning capacitor $C_1$. The resonant circuit is coupled to a full-wave rectifier in the form of the diode bridge rectifier made up of diodes $D_1$-$D_4$. Diodes $D_1$ and $D_4$ are referred to herein as the "common-cathode" diodes, as their cathode terminals are ordinarily coupled to each other (and the output) in the known bridge configuration. Diodes $D_2$ and $D_3$ may be similarly referred to as common-anode diodes.

Diodes $D_1$-$D_4$ need not necessarily all be identical. In particular, since diodes $D_1$ and $D_4$ conduct continuously but diodes $D_2$ and $D_3$ effectively have a 50% duty cycle, these pairs of diodes may be selected to minimize the respective conduction and switching losses. Although this embodiment, and other embodiments, show full wave rectification using four diodes, those skilled in the art will appreciate that two diodes may be used. In other embodiments, diodes $D_2$ and $D_3$ or all of diodes $D_1$-$D_4$ may be replaced by switches selectively operated by a controller to provide active rectification.

The present invention differs from the circuit of FIG. 1 in that the DC inductor $L_{DC}$ is replaced by a pair of inductors, $L_2$ and $L_3$. Rather than having a terminal of the DC inductor $L_{DC}$ coupled to the cathodes of both of the common-cathode diodes, one terminal of each of inductors $L_2$ and $L_3$ in this embodiment are coupled to a cathode of respective common-cathode bridge rectifier diodes $D_1$ and $D_4$, and the other terminals are together coupled to the output of the pick-up circuit (represented by load $V_{Load}$).

In use, the pick-up coil $L_1$ is inductively coupled with the primary conductor represented by inductor $L_T$ (the remainder of the primary side of the IPT system being omitted for clarity). When the primary conductor $L_T$ is energised by an alternating current, a changing magnetic field is produced. Part of that magnetic field passes through pick-up coil $L_1$, inducing a voltage therein which produces an alternating current in the resonant circuit. For optimum efficiency, the pick-up coil $L_1$ and tuning capacitor $C_1$ are preferably selected to resonate at the frequency of the alternating current through conductor $L_T$ (or vice versa).

To supply power to a DC load, the alternating current in the resonant circuit is rectified by the full-wave rectifier. According to the present invention, current preferably continually flows through inductors $L_2$ and $L_3$ during both the positive and negative periods of the alternating current in the resonant circuit. That is, under normal operation the diodes $D_1$ and $D_4$ are always forward-biased with each having an average current equal to half the output current $I_{Load}$. Diodes $D_1$ and $D_3$ each conduct only during respective negative or positive periods of the alternating current in the resonant circuit (i.e. they each have a complementary 50% duty cycle).

Both inductors $L_2$ and $L_3$ therefore deliver power continuously to the load $V_{Load}$. During the positive period, the current flowing through the inductor $L_2$ of the present invention also causes the inductor to store energy in a magnetic field which is released to the load during the negative period. Inductor $L_3$ similarly stores energy during the negative period which is released to the load during the positive period. Energy input to the inductors is thus pulsed, whereas energy output is ordinarily substantially continuous. The current $I_{Load}$ supplied to the load is thus the sum of the currents $I_{L1}$ and $I_{L2}$ through the inductors. In an ideal circuit, the present invention thereby doubles the current supplied to the output of the pick-up circuit. In practice, however, the current may not be precisely doubled with respect to the short circuit current of the pick-up coil due to losses or non-ideal component selection, for example. The terms "current doubler" and the like are thus used in the broad sense of referring to the inductors $L_2$ and $L_3$ alternately storing and releasing energy to increase the current supplied to the output/load. The current is preferably substantially or approximately doubled, but may in practice be increased to a lesser extent without departing from the spirit or scope of the invention.

Figure 3:
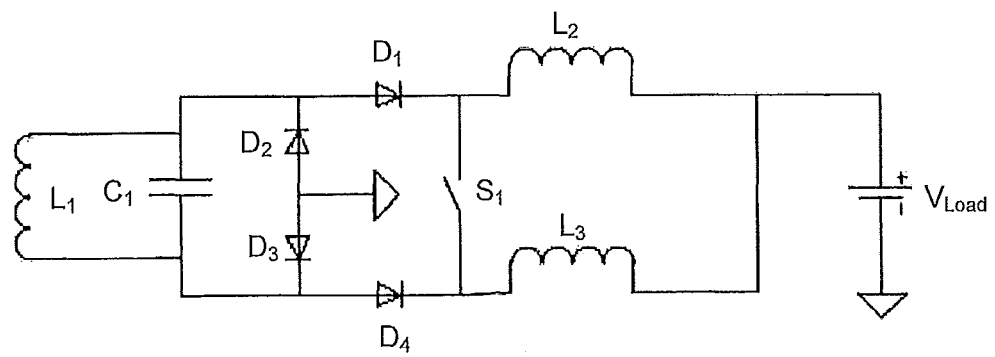
FIG. 3 is a schematic drawing of a parallel-tuned IPT pick-up circuit according to a second embodiment of the present invention.

A second embodiment of the present invention is illustrated in FIG. 3. The primary conductor $L_T$ is omitted from this diagram as it forms no part of the pick-up circuit, instead forming part of the primary side of a complete IPT system of which the present invention may be a part.

The pick-up circuit of FIG. 3 is a modification of FIG. 2 in that it further comprises a mode switch $S_1$ operable to directly couple the cathodes of diodes $D_1$ and $D_4$ and corresponding terminals of inductors $L_2$ and $L_3$.

When mode switch $S_1$ is open or non-conductive, it will be appreciated that the circuit of FIG. 3 operates identically to that of FIG. 2, referred to herein as a current-doubling or first mode of operation, When the mode switch $S_1$ is closed or conductive, however, the circuit topology is reconfigured for a standard or second mode of operation, wherein inductors $L_2$ and $L_3$ are arranged in parallel and thereby effectively form a single DC inductor or choke merely smoothing the output current $I_{Load}$, albeit with an effective inductance less than that of either $L_2$ or $L_3$ individually. Aside from having parallel inductors, the circuit in this standard mode operates similarly to that of FIG. 1.

The mode switch $S_1$ may be a mechanically- or manually-operated switch, but is more preferably an electronically-controlled bi-directional switch comprising a pair of back-to-back series MOSFET transistors, for example. The mode switch may be initially closed so that the pick-up circuit operates in the normal mode, and automatically opened to operate in the current-doubling mode when an increased current is required by the load, and may therefore be thought of as an electrical 'gear change'.

The mode switch $S_1$ effectively doubles the output voltage range over which the pick-up circuit can deliver full power for a given track current variation range in a primary-side controlled system.

In variations of this embodiment of the invention, the mode switch may comprise multiple switches to reconfigure the pick-up circuit topology in some other way to convert from a current-doubling to a standard mode of operation. For example, a single one of the pair of inductors $L_2$ or $L_3$ may be configured, in the standard mode, to couple the rectifier to the output, while the other of the pair of inductors is switched out of the circuit entirely. In another possible example, both of the pair of inductors $L_2$ and $L_3$ could be switched out of the circuit, and a further DC inductor switched into the circuit.

Figure 4:
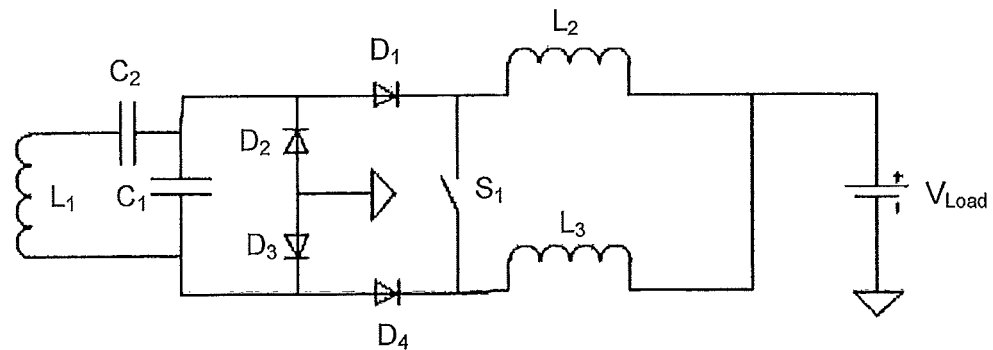
FIG. 4 is a schematic drawing of a parallel-tuned IPT pick-up circuit according to a third embodiment of the present invention.

In yet another embodiment of the invention, the resonant circuit may be partially series-tuned with an additional tuning capacitor $C_2$ provided in series with the pick-up coil $L_1$ as shown in FIG. 4. The pick-up circuit of this embodiment can service a larger range of output requirements, i.e. different battery requirements, and be optimized for each range.

In yet other embodiments, the pick-up circuit may further comprise a power control circuit to provide secondary-side control of the output power of the pick-up circuit and again service a larger range of output requirements. The power control circuit may comprise a power control switch $S_2$ as shown by way of example in FIG. 5. The power control switch $S_2$ in this embodiment is provided in parallel with the output and is operable to selectively decouple the load $V_{Load}$ from the resonant circuit, The power control switch $S_2$ is preferably operated automatically by a closed-loop feedback control circuit (omitted from the diagram for clarity) to regulate the output of the pick-up circuit, The feedback control circuit may operate the switch by pulse-width modulation (PWM) to maintain a desired output voltage, for example. A diode $D_5$ may be added as shown to prevent the load discharging through power control switch $S_2$.

The secondary-side control provided by the power control circuit enables the output of the pick-up circuit to be controlled without any variation in the track current through primary conductor $L_T$. Multiple pick-up circuits can thus be inductively coupled with a single primary power supply. In other IPT systems, the secondary-side control may supplement primary-side control of the pick-up output.

Figure 6:
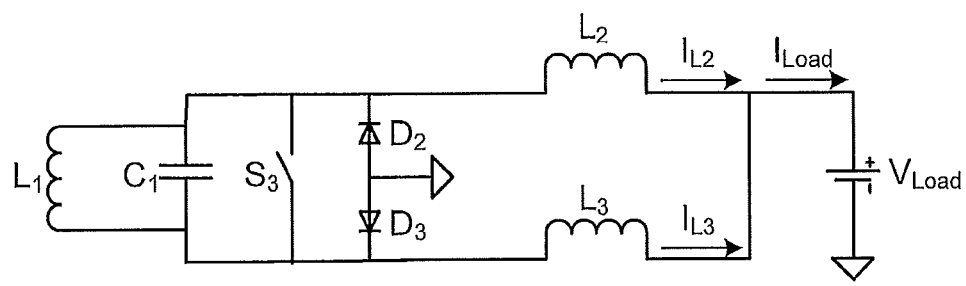
FIG. 6 is a schematic drawing of a pick-up circuit according to a fifth embodiment of the invention.

Another embodiment of an IPT pick-up circuit according to the present invention is shown in FIG. 6. In this embodiment, the diodes $D_1$ and $D_4$ are omitted, Omitting these diodes reduces conduction losses in the pick-up circuit.

Inductive power transfer systems are often used for wireless or contactless charging of an apparatus battery or other voltage source rather than powering a resistive load, wherein the battery supplies power to a load when the apparatus is removed from the charging pad and is recharged wirelessly by the integrated pick-up circuit when the apparatus is returned to the charging pad. Examples of such an apparatus might include an electric toothbrush, mobile telephone, automated guided vehicle (AGV), or electric passenger vehicle, for example. In such cases, the load $V_{Load}$ may comprise a battery or other voltage source.

In the previous embodiments of the invention shown in FIGS. 2-5, diodes $D_1$ and $D_4$ prevent shorting of the voltage source $V_{Load}$ by the pick-up circuit. As those diodes are omitted, the present embodiment instead comprises an AC decoupling switch $S_3$ which is selectively operated to decouple the resonant circuit from the load once charged to prevent shorting the load. The AC switch $S_3$ is preferably actively operated by a controller (omitted from the diagram for clarity).

The AC switch $S_3$ is provided in parallel with the resonant circuit, it is represented by a single switch symbol in the diagram, but may in practice comprise a pair of back-to-back series MOSFET switches, whereby the AC switch is operable to selectively block or conduct current in either direction.

Figure 5:
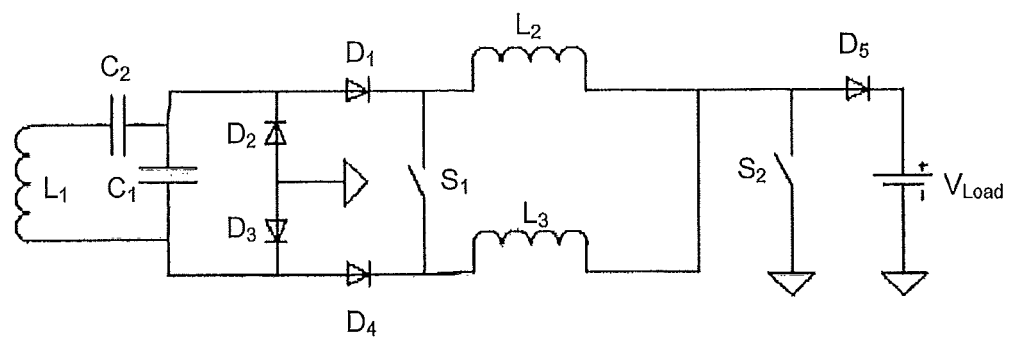
FIG. 5 is a schematic drawing of a parallel-tuned IPT pick-up circuit according to a fourth embodiment of the invention.

While the example embodiments of FIGS. 4-6 each comprise selected features of the preceding embodiments, the mode switch, partial series-tuning, secondary-side power control, and AC decoupling switch features of these embodiments may each be provided independently of each other. Yet other embodiments of the invention may comprise any combination or selection of those four features.

Each of the preceding example embodiments of the present invention are shown with a single pick-up coil $L_1$. In other embodiments of the invention, the pick-up circuit may comprise a plurality of pick-up coils and associated sub-circuits. A pair of substantially orthogonal coils may commonly be provided to allow for limited misalignment of a pick-up with respect to the primary conductor in applications where the pick-up is moveable as disclosed by International Patent Publication No. WO 2007/126321, for example.

Figure 7:
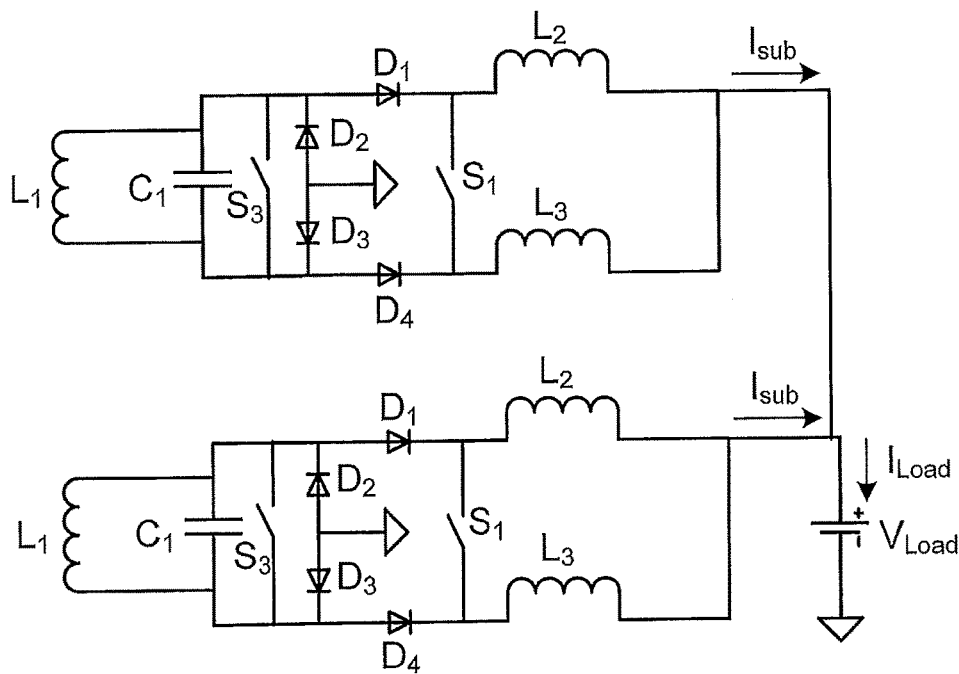
FIG. 7 is a schematic drawing of a pick-up circuit according to a sixth embodiment of the invention.

FIG. 7 shows a pick-up circuit according to the present invention which comprises a pair of pick-up coils $L_1$, which each form part of a pair of identical pick-up sub-circuits similar to the pick-up circuits described above, coupled with a common output load $V_{Load}$. In other embodiments, the pick-up circuits need not necessarily be identical.

The two pick-up sub-circuits in this example each comprise a parallel tuning capacitor $C_1$, AC decoupling switch $S_3$, bridge rectifier comprising diodes $D_1$-$D_4$ mode switch $S_1$, and inductor pair $L_2$ and $L_3$ as previously described.

As described above, the mode switch $S_1$ advantageously allows dynamic reconfiguration of the circuit topology to meet output current requirements. For any given alignment (or coupling coefficient k), the output current can be approximately doubled by opening the mode switch (or halved by closing the mode switch if it is already open).

Figure 8:
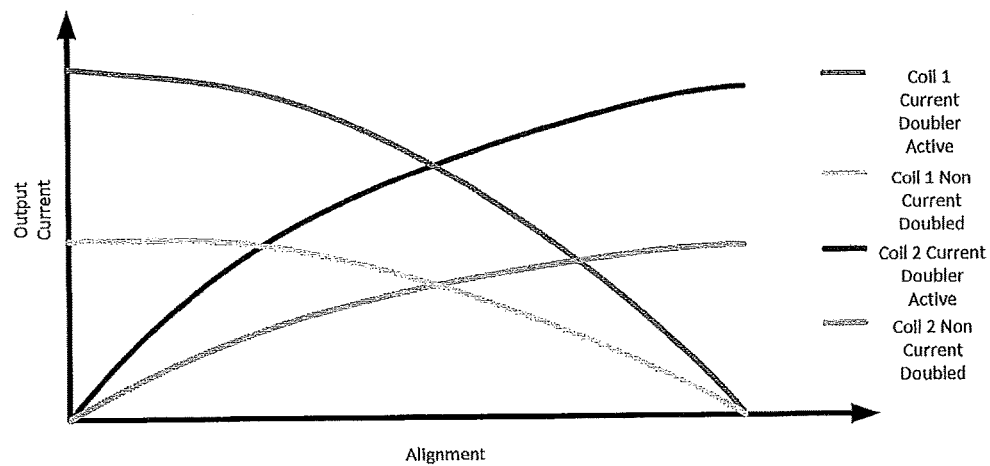
FIG. 8 is a graphical illustration of the effect of the mode switch upon the sub-circuit currents of the sixth embodiment of the invention.

The flexibility of operation provided by the mode switch is particularly advantageous in embodiments of the invention comprising a plurality of pick-up coils and sub-circuits. In such embodiments, the total output current $I_{Load}$ is the sum of the output currents from each sub-circuit, $I_{sub}$. Referring to FIG. 8, the two mode switches $S_1$ of the circuit of FIG. 7 can each be selectively and independently opened to approximately double the sub-circuit output current $I_{sub}$ for any given alignment. As is evident from the diagram, the pick-up coils in this example are arranged substantially orthogonally to allow for limited misalignment as disclosed by WO 2007/126321, whereby at least one of the pick-up coils will intercept the magnetic field generated by the alternating current in the primary conductor.

The plurality of mode switches $S_1$ of the present invention are preferably operated independently from each other to maintain a required total output current That is, the first sub-circuit may operate with the current doubler active (mode switch open) while the second sub-circuit simultaneously operates with the current doubler inactive (mode switch closed), for example.

Alternatively, or additionally, the AC decoupling switches Ss of each sub-circuit may be operated independently to selectively decouple the associated pick-up coil $L_1$ from the output, whereby any number of the plurality of sub-circuits are operable at any given time, providing further control over the output current $I_{Load}$.

Figure 9:
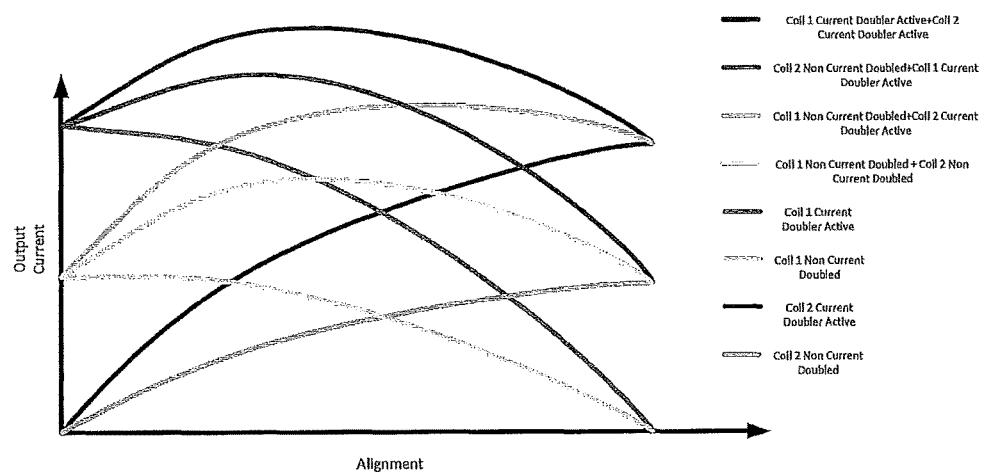
FIG. 9 is a graphical illustration of the eight potential modes of operation of the sixth embodiment of the invention.

With two pick-up coils $L_1$ and both the mode switches $S_1$ and AC switches $S_3$ independently controlled, there are eight different circuit configurations possible as shown in FIG. 9, These comprise the four different configurations of the individual pick-up coils shown in FIG. 8 plus the various combinations thereof. The switches may therefore be controlled to fry and maintain a desired or predetermined minimum output current.

In yet other embodiments, the pick-up circuit of the present invention may comprise three or more pick-up coils $L_1$. This will potentially allow an even greater number of different modes of operation through selective operation of the plurality of decoupling and mode switches.

Figure 10:
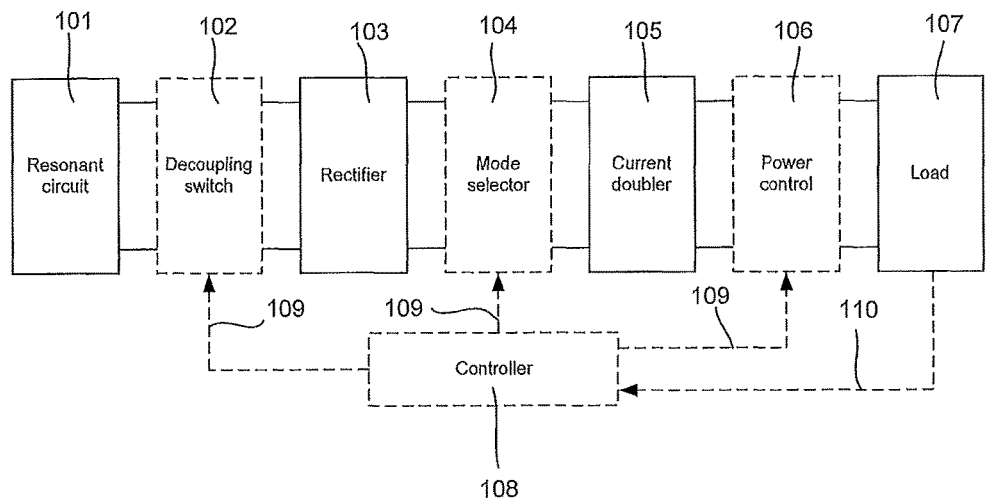
FIG. 10 is a block diagram of a pick-up circuit according to the present invention.

FIG. 10 provides a block diagram of a pick-up circuit according to the present invention, comprising the resonant circuit 101 (comprising pick-up coil $L_1$ and tuning capacitor $C_1$), rectifier 103 (comprising at least diodes $D_2$ and $D_3$ in the example embodiments of FIGS. 2-7), current doubler 105 (comprising inductors $L_2$ and $L_3$), and load 107 (or at least connection terminals for coupling to a load); and the optional decoupling switch 102 (comprising AC switch $S_3$), mode selector 104 (comprising mode switch $S_1$), power control 106 (comprising power control switch $S_2$), and controller 108.

The controller 108 is coupled with the decoupling switch 102, mode selector 104, and/or power control 106, transmitting control signals 109 to operate the modules as described above. In particular, the controller 108 preferably selects the appropriate mode of operation and controls the decoupling switch 102 and mode selector accordingly. The controller 108 may therefore receive one or more input or feedback signals 110 to aid in selecting the most appropriate mode, The feedback signals 110 may comprise signals representative of the sub-circuit output currents $I_{sub}$ or total output current $I_{Load}$, for example.

The design and implementation of an appropriate controller 108 is within the capabilities of a person skilled in the field of electronics engineering upon reading the foregoing description of the present invention.

There are numerous ways in which the controller 108 can be implemented. The controller may be implemented as a purely hardware-based controller consisting of one or more components which may include discrete electronic components and/or analog or digital integrated circuits including operational amplifiers and logic devices, for example. Alternatively, or additionally, the control means may be implemented at least in part as a software-based system using embedded reconfigurable or programmable hardware components such as a programmable logic device (PLD), field programmable gate array (FPGA), or more preferably a processor which may comprise a microcontroller executing embedded software programmed to implement the system and perform the methods of the invention described herein. More commonly, however, the invention would be implemented as an embedded system using a combination of the aforementioned components.

In an example embodiment, the controller 108 comprises a microcontroller coupled to an output current sensor and programmed to execute a closed-loop feedback proportional-integral-derivative (PID) control algorithm to maintain a predetermined minimum output current by controlling the mode, decoupling, and/or power control switches.

Once they are programmed to perform particular functions pursuant to instructions from program software that implements the method of this invention, such PLDs and/or processors in effect become special-purpose computers particular to the method of the invention. The techniques necessary for this are well-known to those skilled in the art of computer systems.

For the purposes of convenience and clarity, a single controller 108 controlling each of the decoupling switch 102, mode selector 104, and power control 106 is shown in the diagram of FIG. 10. However, each of these components of the pick-up circuit may alternatively be controlled by a separate and/or independent controller without departing from the scope of the invention.

From the foregoing it will be seen that an IPT pick-up circuit is provided which, in various embodiments, is particularly suited for supplying low-voltage, high current loads; can be configured to deliver power over a wider voltage range for a given track current variation range; and/or can service a much larger range of output requirements and be optimized for each range. Compared to other known solutions the invention may provide a larger output voltage at a constant power level for a given pick-up design, and provides an additional variable to optimise the overall design. The invention may also have reduced diode losses in the rectifier.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, if is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

Any discussion of the prior art throughout the specification should in no way be considered as an admission that such prior art is widely known or forms part of common general knowledge in the field.

The invention claimed is:

1. An inductive power transfer (IPT) pick-up circuit comprising:
   a resonant circuit comprising an inductive pick-up coil and a parallel tuning capacitor;
   a full-wave rectifier coupled to the resonant circuit and adapted to rectify an AC current received therefrom; and
   a pair of inductors, each inductor arranged to couple the rectifier to an output of the pick-up circuit and alternately store and release energy to the output.

2. The IPT pick-up circuit as claimed in claim 1 wherein the inductors are arranged whereby a first of the pair of inductors stores energy during a positive period of the AC current and releases energy to the output during a negative period, and a second of the pair of inductors stores energy during the negative period of the AC current and releases energy to the output during the positive period.

3. The IPT pick-up circuit as claimed in claim 1 wherein energy input to the inductors is pulsed, but energy output of the inductors is ordinarily substantially continuous.

4. The IPT pick-up circuit as claimed in claim 1 wherein the full-wave rectifier comprises a diode bridge rectifier, and wherein the inductors are each coupled in series between respective common-cathode diodes of the diode bridge rectifier and the output of the pick-up circuit.

5. The IPT pick-up circuit as claimed in claim 1 wherein the full-wave rectifier may comprise a pair of diodes wherein respective anodes of the pair of diodes are coupled with the output and respective cathodes of each of the pair of diodes are coupled with both the resonant circuit and a respective one of the pair of inductors.

6. The IPT pick-up circuit as claimed in claim 1 wherein the pick-up circuit further comprises a mode switch selectively operable to reconfigure the circuit from a first mode to a second mode wherein the inductors are coupled in parallel between the rectifier and the output of the pick-up circuit.

7. The IPT pick-up circuit as claimed in claim 6 wherein the output current of the pick-up circuit in the first mode is greater than in the second mode.

8. The IPT pick-up circuit as claimed in claim 6 wherein in the second mode the pair of inductors both act as a choke to smooth the rectified AC current during both positive and negative periods of the AC current.

9. The IPT pick-up circuit as claimed in claim 1 wherein the resonant circuit further comprises an additional capacitor in series with the pick-up coil, and wherein the resonant circuit is partially series-tuned.

10. The IPT pick-up circuit as claimed in claim 1 wherein the pick-up circuit further comprises a power control switch operable to decouple the output from the rectifier and/or resonant circuit.

11. The IPT pick-up circuit as claimed in claim 1 wherein the pick-up circuit further comprises a decoupling switch in parallel with the resonant circuit for selectively decoupling the rectifier from the resonant circuit.

12. The inductive power transfer (IPT) pick-up circuit comprising a plurality of sub-circuits each coupled with a common output, each sub-circuit comprising an IPT pick-up circuit according to claim 1.

13. An inductive power transfer (IPT) pick-up comprising at least one pick-up circuit, the pick-up circuit comprising:
   a resonant circuit comprising an inductive pick-up coil and a tuning capacitor;
   a rectifier comprising at least two diodes coupled to the resonant circuit and adapted to rectify an AC current received therefrom;
   a pair of inductors each comprising a first terminal coupled with the rectifier and a second terminal coupled with an output of the pick-up; and
   a mode switch operable to select a mode of operation of the circuit, wherein the first terminal of each of the pair of inductors in a first mode is coupled with a cathode of a respective one of the at least two diodes, and in a second mode is coupled with both cathodes.

14. The IPT pick-up as claimed in claim 13 wherein an output current of the circuit is substantially doubled in the first mode with respect to the second mode.

15. The IPT pick-up as claimed in claim 13 wherein the circuit further comprises a decoupling switch operable to decouple the resonant circuit from the rectifier.

16. The IPT pick-up as claimed in claim 13 wherein a controller associated with the or each mode switch and/or decoupling switch and operable to control said switches is based at least in part on an output current of the pick-up.

17. The IPT pick-up as claimed in claim 13 wherein the IPT circuit comprises a sub-circuit.

18. The IPT pick-up as claimed in claim 17 wherein the pick-up comprises a plurality of sub-circuits each coupled with a common output.

19. The IPT pick-up as claimed in claim 18 wherein the mode switch and/or decoupling switch of each sub-circuit is independently operable.

20. A method for controlling an output current of an inductive power transfer (IPT) pick-up circuit, the method comprising steps of:
   sensing an output current of the IPT circuit; and
   selectively operating a mode switch to reconfigure the circuit between a first mode and a second mode dependent at least in part on the sensed output current, wherein the output current of the IPT circuit is substantially doubled in the first mode with respect to the second mode.

21. An IPT pick-up, pick-up circuit, or method of controlling an IPT pick-up circuit substantially as herein described.

* * * * *